US008638055B2

(12) United States Patent
Kallioniemi

(10) Patent No.: US 8,638,055 B2
(45) Date of Patent: Jan. 28, 2014

(54) TRANSPORT SYSTEM

(75) Inventor: Antti Kallioniemi, Jokela (FI)

(73) Assignee: Kone Corporation, Helsinki (FI)

(*) Notice: Subject to any disclaimer, the term of this patent is extended or adjusted under 35 U.S.C. 154(b) by 0 days.

(21) Appl. No.: 13/305,242

(22) Filed: Nov. 28, 2011

(65) Prior Publication Data

US 2012/0067673 A1 Mar. 22, 2012

Related U.S. Application Data

(63) Continuation of application No. PCT/FI2010/000032, filed on May 18, 2010.

(30) Foreign Application Priority Data

Jun. 1, 2009 (FI) ...................................... 20090221

(51) Int. Cl.
*H02P 6/14* (2006.01)
(52) U.S. Cl.
USPC ................... 318/400.26; 318/400.3; 318/722; 318/550
(58) Field of Classification Search
USPC ......... 318/798, 800, 801, 803, 805, 813, 550, 318/552; 187/289, 290, 293, 295, 296, 297
See application file for complete search history.

(56) References Cited

U.S. PATENT DOCUMENTS

| 4,535,280 | A | * | 8/1985 | Harvest et al. ................. 318/798 |
| 5,058,710 | A | * | 10/1991 | Iwasa ............................ 187/290 |
| 5,712,456 | A | * | 1/1998 | McCarthy et al. ............. 187/290 |
| 5,936,375 | A | * | 8/1999 | Enoki ............................ 318/727 |
| 6,454,053 | B2 | * | 9/2002 | Tominaga et al. ............. 187/290 |
| 6,533,074 | B2 | * | 3/2003 | Tominaga et al. ............. 187/290 |
| 6,611,126 | B2 | * | 8/2003 | Mizuno .......................... 318/801 |
| 6,742,630 | B2 | * | 6/2004 | Eilinger ......................... 187/290 |
| 6,870,279 | B2 | * | 3/2005 | Gilbreth et al. ................. 290/52 |
| 7,227,323 | B2 | * | 6/2007 | Yamada et al. ................ 318/376 |
| 7,228,942 | B2 | * | 6/2007 | Takehara et al. .............. 187/290 |
| 7,608,937 | B1 | * | 10/2009 | Altenschulte ................... 290/44 |
| 8,253,361 | B2 | * | 8/2012 | Kleibaumhuter et al. ......................... 318/400.31 |
| 2001/0017237 | A1 | | 8/2001 | Tominaga et al. |

(Continued)

FOREIGN PATENT DOCUMENTS

| JP | 2002338151 A | 11/2002 |
| JP | 2005102410 A | 4/2005 |
| WO | WO-2005075333 A1 | 8/2005 |

OTHER PUBLICATIONS

International Search Report for International Application No. PCT/FI2010/000032 dated May 18, 2010.

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

A power supply system of a transport system includes: a direct-current intermediate circuit; a motor bridge connected to the direct-current intermediate circuit, for supplying power between the direct-current intermediate circuit and the motor that moves the transport appliance; and also an energy storage and a direct-current converter based on indirect power transmission connected between the energy storage and the direct-current intermediate circuit, for controlling the power supply between the energy storage and the direct-current intermediate circuit. The direct-current converter based on indirect power transmission includes: a controllable solid-state switch, for disconnecting the power supply occurring from the energy storage.

10 Claims, 3 Drawing Sheets

(56) References Cited

U.S. PATENT DOCUMENTS

Figure 1:
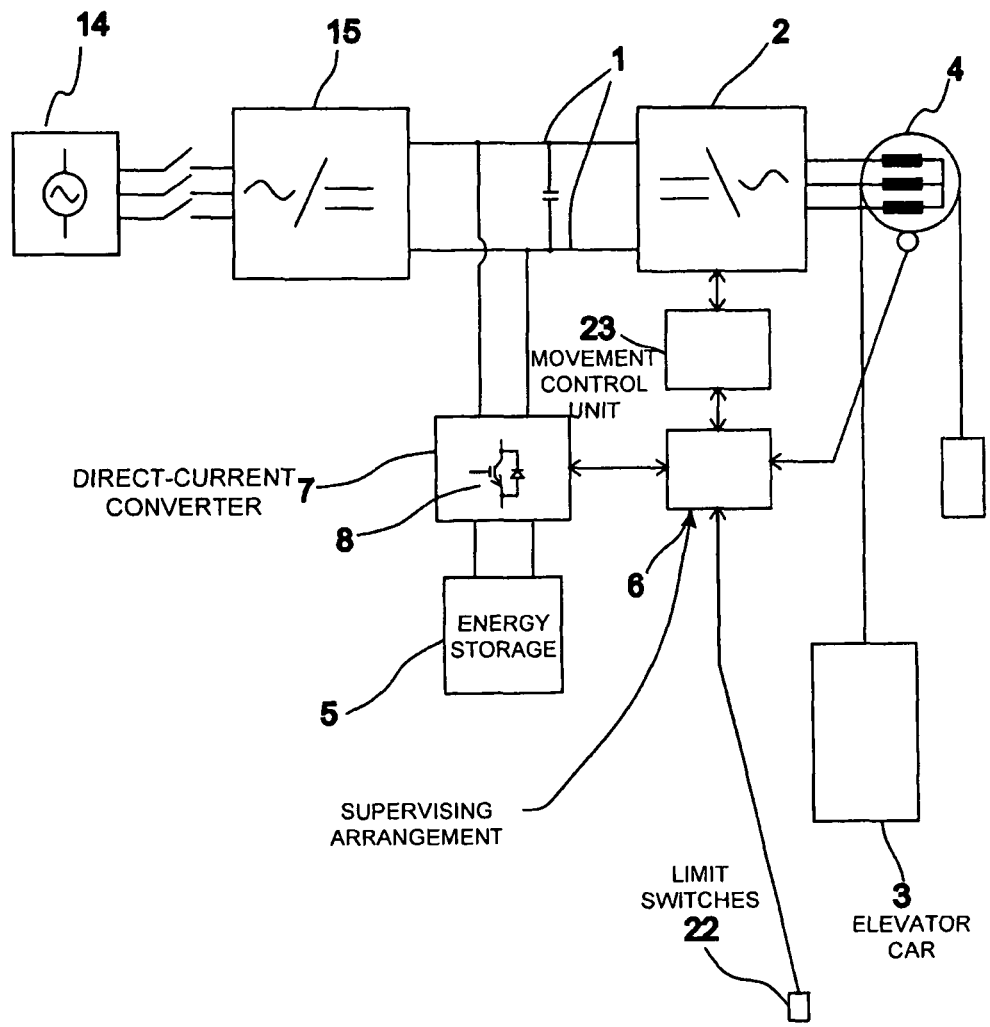

| | | |
|---|---|---|
| 2001/0017241 A1 | 8/2001 | Tajima et al. |
| 2002/0189906 A1 | 12/2002 | Tominaga et al. |
| 2004/0035646 A1 | 2/2004 | Araki |
| 2007/0137945 A1 | 6/2007 | Takasaki et al. |
| 2007/0179376 A1 | 8/2007 | Gerder |
| 2011/0175579 A1* | 7/2011 | Mazumdar .................... 320/167 |
| 2011/0247900 A1* | 10/2011 | Blasko et al. ................. 187/247 |

* cited by examiner

TRANSPORT SYSTEM

This application is a continuation of and claims priority under 35 U.S.C. §120 to PCT/FI2010/000032 filed on May 18, 2010, which is an international application claiming priority from FI 20090221 filed on Jun. 1, 2009, the entire contents of each of which are hereby incorporated herein by reference.

The invention relates to power supply systems in transport systems, more particularly in connection with the electric motor drives of transport systems.

The power supply between a power source and a motor that moves a transport appliance generally occurs under control with an electronic appliance, such as with a frequency converter. For the sake of safety, the power supply from the power source to the motor must also, if necessary, be disconnected. The aim of disconnecting the power supply is to prevent possible dangerous situations, which movement of the transport appliance could otherwise cause e.g. in a failure situation, in connection with servicing and installation, and also during a standstill of the transport system. Disconnection of the power supply is normally performed with a separate contactor. As a mechanical component, however, a contactor is unreliable and has a short service life; in addition, the operation of a contactor produces disturbing noise.

Recently also electrical energy storages, such as lithium-ion accumulators as well as supercapacitors, which have a considerably higher capacitance than conventional capacitors, have begun to be used in the power supply systems of transport systems. Energy can be charged into the energy storage during motor braking, and the charged energy can later be supplied back from the energy storage to the motor that moves the transport appliance, which improves the efficiency ratio of the transport system.

Electrical energy storages are often connected to the direct-current intermediate circuit of a frequency converter. The safe operation of the transport system requires that also the power supply directed from the energy storage towards the motor via the frequency converter can, if necessary, be disconnected.

Publication EP 1708949 presents a solution wherein a power supply from an energy storage to a direct-current intermediate circuit is disconnected with a separate mechanical contactor. Adding a contactor to the power supply system, however, causes the aforementioned problems.

The aim of this invention is to solve the aforementioned drawbacks as well as the drawbacks disclosed in the description of the invention below. In this case a new type of solution for disconnecting the power supply in a power supply system of a transport system is presented.

In relation to the characteristic attributes of the invention, reference is made to the claims.

Some inventive embodiments are also discussed in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts.

The invention relates to a power supply system of a transport system. The power supply system comprises a direct-current intermediate circuit, and also a motor bridge connected to the direct-current intermediate circuit, for supplying power between the direct-current intermediate circuit and the motor that moves the transport appliance. The power supply system also comprises an energy storage as well as a direct-current converter based on indirect power transmission, which is connected between the energy storage and the direct-current intermediate circuit. With the direct-current converter based on indirect power transmission, the power supply between the energy storage and the direct-current intermediate circuit is controlled. The direct-current converter based on indirect power transmission comprises a controllable solid-state switch, for disconnecting the power supply occurring from the energy storage. A direct-current converter based on indirect power transmission refers in this context to the type of power supply apparatus in which power supply from an energy storage to a DC intermediate circuit occurs in at least two different phases such that energy is first charged from the energy storage into an internal energy storage, such as inductance or capacitance, of the power supply apparatus, and after this the power supply from the energy storage to the internal energy storage of the power supply apparatus is disconnected with a solid-state controllable switch before the energy charged into the internal energy storage of the power supply apparatus is supplied onwards to the direct-current intermediate circuit. The power supply apparatus can in this case also operate bi-directionally, such that the power supply can occur optionally either from the energy storage to the direct-current intermediate circuit or from the direct-current intermediate circuit to the energy storage. One advantage of the power supply system according to the invention is that the power supply directed towards the motor that moves the transport appliance from the energy storage can be disconnected with the solid-state controllable switch of the direct-current converter based on indirect power transmission, and no separate disconnection device, such as a contactor, is necessarily needed. At the same time the power supply system is simplified and the space problems, reliability problems and noise problems caused by the use of a mechanical contactor are reduced or completely eliminated. Additionally, a failure into short-circuiting of the controllable solid-state switch of the direct-current converter based on indirect power transmission does not produce a direct power flow from the energy storage to the direct-current intermediate circuit, which increases the safety of the power supply system according to the invention.

Figure 2:
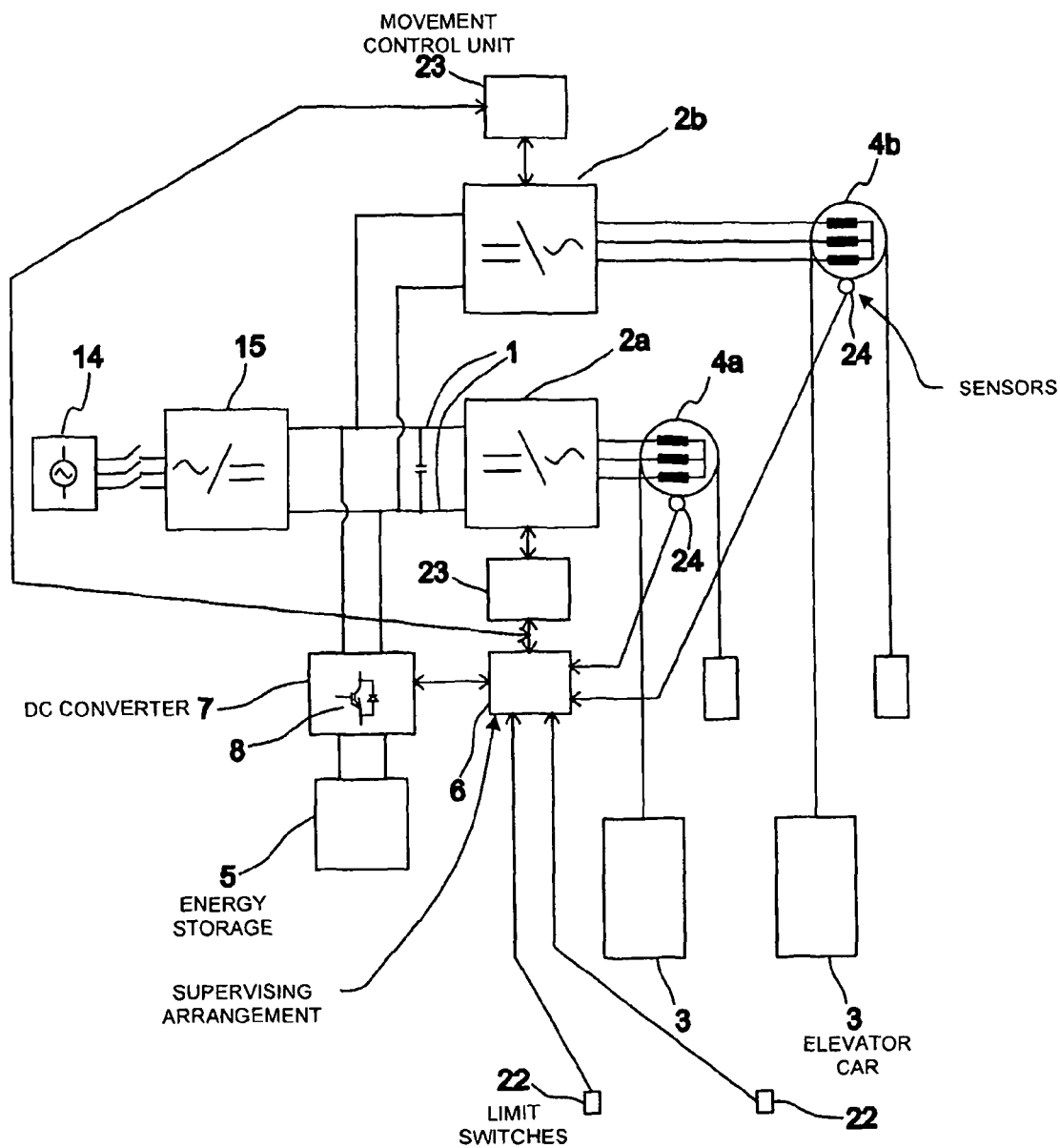
Figure 3:
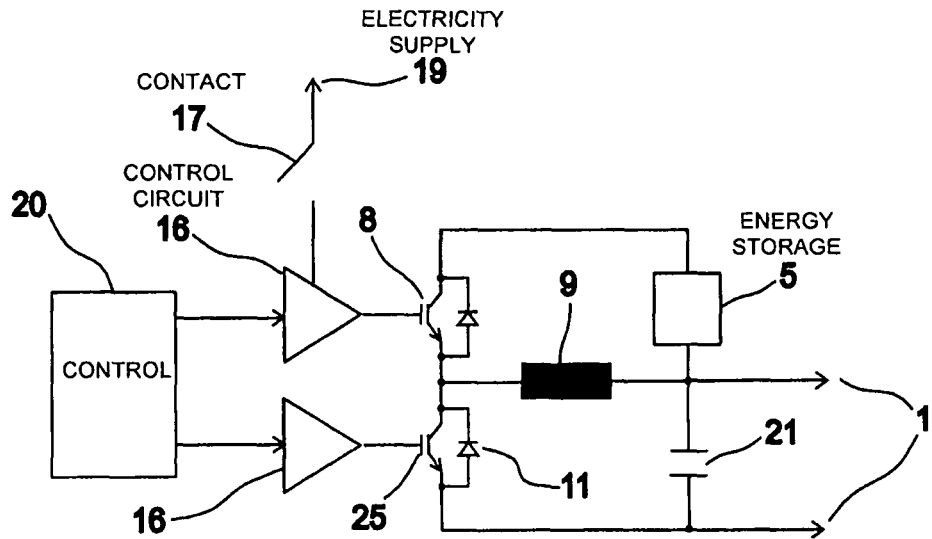
Figure 4:
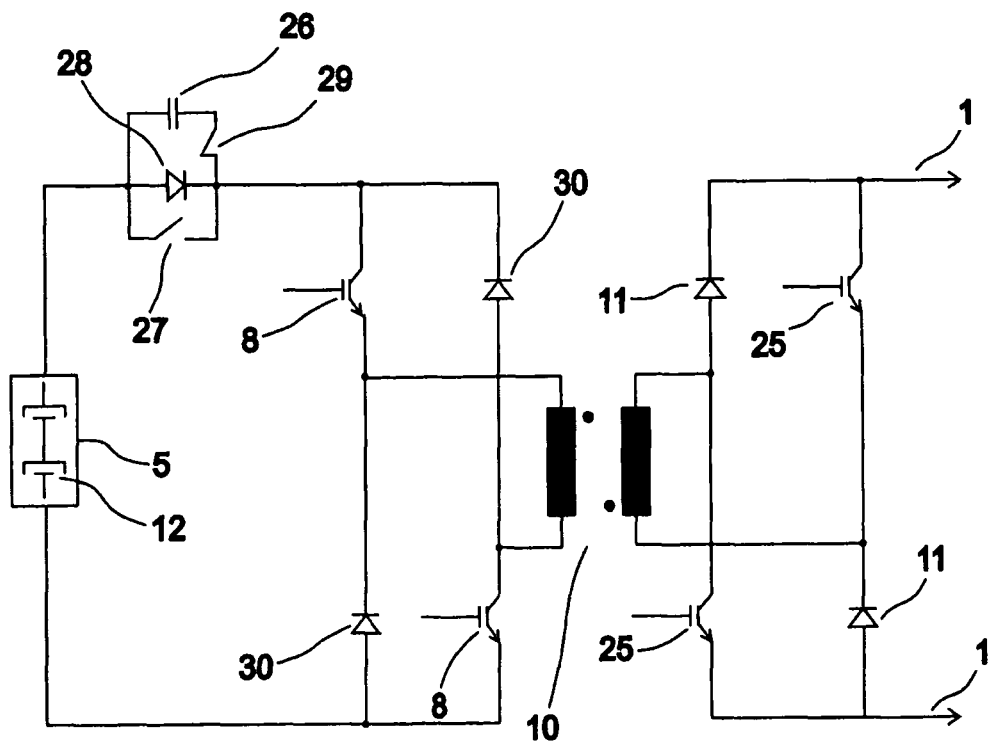

In the following, the invention will be described in more detail by the aid of a few examples of its embodiments with reference to the attached drawings, wherein FIG. 1 presents a power supply system of an elevator system according to the invention FIG. 2 presents a second power supply system of an elevator system according to the invention FIG. 3 presents a direct-current converter based on indirect power transmission according to the invention, FIG. 4 presents a second direct-current converter based on indirect power transmission according to the invention, FIG. 1 presents a power supply system of an elevator system according to the invention. Power supply between the electricity network 14 and the elevator motor 4 that moves the elevator car 3 occurs with a frequency converter. The frequency converter comprises a network bridge 15, which is connected between the phases of the electricity network 14 and the busbars of the direct-current intermediate circuit 1. The network bridge 15 converts the alternating voltage of the electricity network 14 into the direct voltage of the direct-current intermediate circuit 1. A separate circuit-breaker, e.g. a contactor, is often also fitted between the network bridge 15 and the electricity network 14, with which the electricity supply occurring from the electricity network can be disconnected. The frequency converter also comprises an inverter 2, which is connected between the busbars of the direct-current intermediate circuit 1 and the phases of the elevator motor 4. The inverter further converts the DC voltage of the direct-current intermediate circuit into the variable amplitude and variable frequency supply voltage of the elevator motor.

The power supply system also comprises an energy storage 5. The power supply between the direct-current intermediate circuit 1 of the frequency converter and the energy storage 5 occurs with a direct-current converter 7 based on indirect power transmission. A direct-current converter 7 based on indirect power transmission is connected between the direct-current intermediate circuit 1 of the frequency converter and the energy storage, in which case the direct-current converter 7 performs a voltage matching of the DC voltage between the busbars of the direct-current intermediate circuit 1 and the DC voltage between the poles of the energy storage. The energy storage can comprise an accumulator, such as a lithium-ion accumulator, in one embodiment of the invention the energy storage comprises supercapacitors 12 connected in series with each other. The voltage of supercapacitors varies according to the state of charge, in which case the direct-current converter based on indirect power transmission performs a voltage matching of the varying DC voltage of the supercapacitors 12 of the energy storage 5 and the voltage of the direct-current intermediate circuit 1 of the frequency converter.

The elevator system also comprises a supervising arrangement 6 for detecting an operational nonconformance of the elevator system and for forming a signal indicating an operational nonconformance. The supervising arrangement 6 comprises different sensors that determine the operating status of the elevator system. These types of sensors are e.g. the limit switches 22 that measure the position of the elevator car in the elevator hoistway, possible sensors that determine the safety of temporary service spaces of the elevator hoistway, sensors 24 that measure the speed of the elevator motor and/or the elevator car, and also sensors that determine the status of the entrances of the elevator hoistway and thus a possible intrusion into the elevator hoistway (not in figure). The supervising arrangement also comprises different mechanical safety devices of the elevator, such as sensors that determine the operating status of the overspeed governor and also of the buffers disposed on the roof of the elevator car and/or in the pit of the elevator hoistway (not in figure).

On the basis of the measuring data of the aforementioned sensors, the supervising arrangement 6 determines a possible operational nonconformance, such as an emergency situation or a fault situation. The signal that indicates an operational nonconformance is taken to the movement control unit 23 of the elevator as well as to the direct-current converter 7 based on indirect power transmission. The direct-current converter 7 comprises a controllable solid-state switch 8, which is controlled open if necessary in connection with an operational nonconformance. When the controllable solid-state switch 8 opens, the power supply from the energy storage 5 is disconnected, in which case also the torque-producing effect of the power supplied from the energy storage 5 to the elevator motor ceases.

During normal operation of the elevator, the movement control unit 23 controls the movement of the elevator car according to the elevator calls. The movement control unit in this case sends if necessary a request to disconnect power supply to the direct-current converter 7 based on indirect power transmission, so that the power supply from the energy storage 5 is disconnected by opening the controllable solid-state switch 8 during a standstill of the elevator.

The power supply system of an elevator system to be presented in FIG. 2 also comprises a second motor bridge 2b, in addition to the features presented in the embodiment of FIG. 1, which is connected to the same direct-current intermediate circuit 1 as the first motor bridge 2a. Each of the motor bridges 2a, 2b is connected to the elevator motor 4a, 4b that moves the elevator car, for supplying power between the direct-current intermediate circuit 1 and the elevator motors 4a, 4b that move the elevator cars. In this case it is possible that one of the elevator motors brakes, supplying power via the motor bridge to the direct-current intermediate circuit at the same time as the other elevator motor receives power from the direct-current intermediate circuit via the motor bridge. Since the power in this case circulates via the direct-current intermediate circuit 1 between the elevator motor 4a, 4b and the energy storage 5, the power supply from the electricity network 14 via the network bridge 15 to the direct-current intermediate circuit 14 can be reduced.

FIG. 3 presents the main circuit of a direct-current converter 7 based on indirect power transmission. The direct-current converter 7 based on indirect power transmission according to FIG. 3 is suited for use e.g. in power supply systems according to the embodiments of FIGS. 1 and 2. A direct-current converter 7 based on indirect power transmission is connected between the energy storage 5 and the direct-current intermediate circuit 1. The direct-current converter based on indirect power transmission comprises a control 20, with which the first 8 and the second 25 IGBT transistors are connected with short pulses, for controlling the power supply between the energy storage 5 and the direct-current intermediate circuit 1. A choke 9 functions as the internal energy storage of the direct-current converter 7, into which choke current from the energy storage 5 is charged by closing the IGBT transistor 8. After the choke is charged, the IGBT transistor 8 is opened, in which case the power supply from the energy storage 5 is disconnected and the current of the choke 9 commutates to flow via the diode 11 to the direct-current intermediate circuit 1, in which case the energy charged into the choke 9 moves onwards to the direct-current intermediate circuit 1.

Control of the IGBT transistors 8, 25 occurs by supplying electricity to the gate 18 with the control circuit 16. The electricity supply 19 of the control circuit 16 connected to the gate of the first IGBT transistor 8 is taken via a contact 17 of a safety relay. The safety relay determines an operational nonconformance of the transport system such that in connection with an operational nonconformance the current supply to the coil of the safety relay ceases, in which case the contact 17 of the safety relay opens. When the contact opens, the gate voltage of the IGBT transistor 8 drops, in which case the current flow via the IGBT transistor 8 ceases.

Power supply from the direct-current intermediate circuit 1 to the energy storage 5 can also be controlled with the direct-current converter 7 of FIG. 3 by connecting the second IGBT transistor 25 with short pulses. In this case power supply from the direct-current intermediate circuit 1 towards the energy storage 5 is also possible during ah operational nonconformance of the transport system when the safety relay 17 is open. Electricity can in this way be supplied to the energy storage 5 e.g. in a situation in connection with a power outage of the elevator system, in which elevator passengers are transferred to the exit floor by driving the elevator motor with the gravitational force of the elevator car. In this case the elevator motor returns electrical power to the intermediate circuit, from where it can be transferred onwards to the energy storage with the control of the switch 25.

FIG. 4 presents the main circuit of a second direct-current converter 7 based on indirect power transmission. The direct-current converter 7 based oh indirect power transmission according to FIG. 4 is suited for use e.g. in power supply systems according to the embodiments of FIGS. 1 and 2. A direct-current converter 7 based oh indirect power transmission is connected between the energy storage 5 comprised of supercapacitors 12 and the direct-current intermediate circuit 1. The first 8 and the second 25 IGBT transistors are connected with short pulses, for controlling the power supply between the energy storage 5 and the direct-current intermediate circuit 1. A transformer 10 functions as the internal energy storage of the direct-current converter 7, into the first winding of which transformer current from the energy storage 5 is charged by closing the IGBT transistors 8. After the transformer is charged, the IGBT transistors 8 are opened, in which case the power supply from the energy storage 5 is disconnected and the current starts to flow first via the diodes 29 through the capacitor 26 back to the energy storage 5 until, after the voltage of the capacitor 26 has increased sufficiently, the current switches to flow from the second winding of the transformer via the diodes 11 to the direct-current intermediate circuit 1, in which case the energy charged into the transformer 10 moves onwards to the direct-current intermediate circuit 1. When the IGBT transistors 8 are closed the next time, the energy charged into the capacitor 26 moves into the transformer 10, which improves the efficiency ratio of the direct-current converter 7.

The current flow of the IGBT transistors 8 is disconnected with a safety relay in a corresponding manner to disconnection of the current flow of the IGBT transistor 8 in the embodiment of FIG. 3.

With the direct-current converter 7 of FIG. 4, the power supply from the direct-current intermediate circuit 1 to the energy storage 5 can also be controlled by connecting the IGBT transistors 25 with short pulses. In this case, before starting the power supply the switch 27 is closed so that current is able to flow past the diode 28 to the energy storage 5. A short-circuit between the poles of the capacitor 26 is prevented by opening the switch 29 before the closing of the switch 27.

Instead of an IGBT transistor, also e.g. a MOSFET transistor, a bipolar transistor or another semiconductor switch can be used as a controllable solid-state switch.

In the above the embodiments of the invention are described in connection with an elevator system with counterweight, the power supply system according to the invention is suited, however, to many other transport systems, such as e.g. to elevator systems without counterweight, crane systems, positive drive elevators, and also to escalator systems and travelator systems. The term transport appliance refers in the invention to a part of a transport system with which the object to be transported is moved.

The invention is not limited solely to the embodiments described above, but instead many variations are possible within the scope of the inventive concept defined by the claims below.

The invention claimed is:

1. A power supply system of a transport system, the power supply system comprising:
    a direct-current intermediate circuit;
    a motor bridge connected to the direct-current intermediate circuit, the motor bridge being configured to supply power between the direct-current intermediate circuit and a motor configured to move a transport appliance;
    an energy storage device;
    a direct-current converter connected between the energy storage device and the direct-current intermediate circuit, the direct-current converter being configured to control a supply of power between the energy storage device and the direct-current intermediate circuit, and the direct-current converter including,
        an internal energy storage,
        a controllable solid-state switch configured to supply current from the energy storage device to the internal energy storage when closed, and to disconnect the energy storage device from the internal energy storage when opened, and
        wherein the direct current converter is configured to supply current from the internal energy storage to the direct-current intermediate circuit after the energy storage device is disconnected from the internal energy storage.

2. The power supply system according to claim 1, wherein the transport system comprises:
    a supervising arrangement configured to detect an operational nonconformance of the transport system, the supervising arrangement being further configured to generate a signal indicative of the detected operational nonconformance.

3. The power supply system according to claim 1, wherein the controllable solid-state switch is configured to control the supply of power from the energy storage device to the direct-current intermediate circuit based on short pulses during normal operation of the transport system.

4. The power supply system according to claim 1, wherein the energy storage device includes a supercapacitor.

5. The power supply system according to claim 1, wherein the energy storage device includes an accumulator.

6. The power supply system according to claim 1, further comprising:
    a network bridge connected between an alternating electricity source and the direct-current intermediate circuit.

7. The power supply system according to claim 1, further comprising:
    at least two motor bridges connected to the direct-current intermediate circuit, each of the at least two motor bridges being connected to a corresponding motor configured to move the transport appliance, and each of the at least two motor bridges being configured to supply power between the direct-current intermediate circuit and the corresponding motor.

8. The power supply system according to claim 1, wherein the direct-current converter is configured to operate in at least two different phases, and wherein in a first of the at least two different phases the energy storage device is configured to charge the internal energy storage, and in a second of the at least two different phases the supply of power from the energy storage device to the internal energy storage is disconnected and the internal energy storage is configured to supply energy to the direct-current intermediate circuit.

9. A power supply system of a transport system, the power supply system comprising:
    a direct-current intermediate circuit;
    a motor bridge connected to the direct-current intermediate circuit, the motor bridge being configured to supply power between the direct-current intermediate circuit and a motor configured to move a transport appliance;
    an energy storage device;
    a direct-current converter connected between the energy storage device and the direct-current intermediate circuit, the direct-current converter being configured to control a supply of power between the energy storage device and the direct-current intermediate circuit, and the direct-current converter including,
a controllable solid-state switch configured to disconnect the supply of power between the energy storage device and the direct-current intermediate circuit,
an inductive component,
a second solid-state switch,
wherein, when closed, the controllable solid-state switch is configured to supply current from the energy storage device to the inductive component,
wherein, when opened, the controllable solid-state switch is configured to disconnect the energy storage device from the inductive component, and
wherein the second solid-state switch is configured to supply current from the inductive component to the direct-current intermediate circuit by switching to a conductive state after the controllable solid-state switch is opened.

10. A power supply system of a transport system, the power supply system comprising:
a direct-current intermediate circuit;
a motor bridge connected to the direct-current intermediate circuit, the motor bridge being configured to supply power between the direct-current intermediate circuit and a motor configured to move a transport appliance;
an energy storage device;
a direct-current converter connected between the energy storage device and the direct-current intermediate circuit, the direct-current converter being configured to control a supply of power between the energy storage device and the direct-current intermediate circuit, and the direct-current converter including,
a controllable solid-state switch configured to disconnect the supply of power between the energy storage device and the direct-current intermediate circuit;
a control circuit connected to a control pole of the controllable solid-state switch; and
a safety relay configured to indicate an operational non-conformance of the transport system, a contact of the safety relay being coupled to the control circuit, and being configured to disconnect the supply of power from the energy storage device.

* * * * *